(12) United States Patent
Segerstrom et al.

(10) Patent No.: US 9,435,520 B2
(45) Date of Patent: Sep. 6, 2016

(54) GIMBAL SYSTEMS PROVIDING HIGH-PRECISION IMAGING CAPABILITIES IN A COMPACT FORM-FACTOR

(71) Applicants: Eric Segerstrom, Austin, TX (US); Greg Mooty, Austin, TX (US); Rick Miller, Austin, TX (US)

(72) Inventors: Eric Segerstrom, Austin, TX (US); Greg Mooty, Austin, TX (US); Rick Miller, Austin, TX (US)

(73) Assignee: ASCENDANT ENGINEERING SOLUTIONS, Austin, TX (US)

( * ) Notice: Subject to any disclaimer, the term of this patent is extended or adjusted under 35 U.S.C. 154(b) by 600 days.

(21) Appl. No.: 13/964,060

(22) Filed: Aug. 10, 2013

(65) Prior Publication Data

US 2014/0049643 A1    Feb. 20, 2014

Related U.S. Application Data

(60) Provisional application No. 61/683,894, filed on Aug. 16, 2012.

(51) Int. Cl.

| | |
|---|---|
| *F21V 21/30* | (2006.01) |
| *F21V 5/00* | (2015.01) |
| *B64D 47/08* | (2006.01) |
| *G02B 27/64* | (2006.01) |
| *F41G 3/14* | (2006.01) |
| *F41G 3/22* | (2006.01) |
| *G01J 3/02* | (2006.01) |
| *G01J 3/28* | (2006.01) |

(52) U.S. Cl.
CPC ............... *F21V 21/30* (2013.01); *B64D 47/08* (2013.01); *F21V 5/00* (2013.01); *F41G 3/145* (2013.01); *F41G 3/22* (2013.01); *G01J 3/0202* (2013.01); *G01J 3/0289* (2013.01); *G01J 3/2823* (2013.01); *G02B 27/644* (2013.01)

(58) Field of Classification Search
None
See application file for complete search history.

(56) References Cited

U.S. PATENT DOCUMENTS

| | | | |
|---|---|---|---|
| 2009/0160951 A1* | 6/2009 | Anderson | H04N 5/2252 348/208.4 |
| 2009/0228159 A1* | 9/2009 | Flowers | F41G 7/2293 701/3 |
| 2010/0220390 A1* | 9/2010 | Wein | F41G 3/22 359/429 |

* cited by examiner

*Primary Examiner* — Michael Teitelbaum
(74) *Attorney, Agent, or Firm* — David O Simmons; IVC Patent Agency

(57) ABSTRACT

A small form-factor gimbal system that provides for stabilization of payload assets in a manner that provides improved stabilization capability. Such a small form-factor gimbal system provides for precision payload asset steering functionality through integration of an inertially stabilized two-axis gimbal in combination with a beam stabilization mechanism (BSM). In a preferred embodiment, such a small form-factor gimbal system has a gimbal diameter of about 5" or less and employs a laser assembly having a Coudé path arrangement in which the laser beam passes from the azimuth subassembly to the elevation subassembly along the elevation subassembly rotational axis.

16 Claims, 5 Drawing Sheets

GIMBAL SYSTEMS PROVIDING HIGH-PRECISION IMAGING CAPABILITIES IN A COMPACT FORM-FACTOR

CROSS REFERENCE TO RELATED APPLICATIONS

This non-provisional patent application claims priority from the U.S. provisional patent application having Ser. No. 61/683,894 filed Aug. 16, 2012 entitled "GIMBAL SYSTEMS PROVIDING HIGH-PRECISION IMAGING CAPABILITIES IN A COMPACT FORM-FACTOR", having a common applicant herewith, and being incorporated herein in its entirety by reference.

FIELD OF THE DISCLOSURE

The disclosures made herein relate generally to gimbal systems and, more particularly, to packaging a high power laser marker/designator, beam shaping optics, and steering mirror in a compact form factor gimbal system.

BACKGROUND

Gimbal systems that offer precision laser marker/designator capability and that are relatively small (e.g., gimbal diameter of less than about 5") do not currently exist. In the context of the present invention, a gimbal system refers to a gimbal assembly (i.e., a gimbal) and system components (e.g., payload assets and associated electronics) mounted thereon. Currently available gimbal systems that are suitably small for use in precision applications such as, for example, relatively small unmanned air vehicles (UAVs) do not meet pointing performance requirements needed for target designation. Some of these UAV platforms require pointing accuracies measured in a few degrees or less. In such UAV applications, a suitably high resolution of pointing accuracy is required as it is necessary to accurately hold a laser designator spot on a target for delivering laser-guided ordinance. As an example, UAV applications can require a laser beam stabilization of less than about 25 µrad.

A two-axis azimuth/inner elevation (i.e., el-over-az) gimbal is a well-known configuration of gimbal and is preferred configuration of gimbal for many applications. One reason a two-axis el-over-ax gimbal system is preferred for certain applications is because its low number of pivot axes corresponds to an overall construction that can offer relatively low weight. However, its low number of pivot axes has an adverse impact on its pointing performance.

A two-axis el-over-az gimbal consists of three main subassemblies. A base subassembly (i.e., a gimbal base structure of the gimbal) and provides mounting features and interconnect to a vehicle or other form of apparatus on which it is installed and, thus, the base is fixed with respect to the vehicle. An azimuth subassembly (i.e., a gimbal azimuth structure of the gimbal) rotates about the base subassembly, typically along an axis normal to the primary mounting plane of the base. An elevation subassembly (i.e., a gimbal elevation structure of the gimbal) is supported by the azimuth subassembly and rotates about an axis normal to the axis of rotation of the azimuth subassembly. Each one of the pivoting gimbal subassemblies is a nested axis subassembly of a gimbal.

The axis of rotation of the elevation subassembly typically contains a payload comprising a suite of sensors and/or indicators (i.e., payload assets), such as for example cameras, laser range finders (LRF), and laser pointers/markers/designators. The payload assets are typically pointed such that lines of sight of the sensors and indicators are in a direction normal to the axis of rotation of the elevation subassembly. This allows the payload assets to be directed in an arbitrary direction by moving the azimuth and elevation subassemblies.

It is well known that high power lasers are used to identify targets to other systems such as, for example, laser-guided munition systems. Along with their inherent size, packaging a targeting laser requires considerations for thermal stabilization and dissipation. As such, the subassembly that carries the laser must have sufficient characteristics for meeting thermal stabilization and dissipation requirements as well as overall space requirements. Furthermore, in order to have the laser output follow the pointing direction of the other payload assets (i.e., be boresighted to the other payload assets), the output of the laser (i.e., laser beam) must pass into the elevation subassembly before being transmitted out of the gimbal system. One approach for this is referred to a Coudé path in which the laser beam passes from the azimuth subassembly to the elevation subassembly along the elevation subassembly rotational axis. Through such a path arrangement, the laser beam incoming to the elevation subassembly is in generally the same location regardless of the angle of rotation of the elevation subassembly.

In order to maintain an acceptable spot size on the target, the divergence of the laser beam must be low. This is typically achieved using a beam expanding telescope, which reduces divergence while increasing beam diameter, as the divergence at the output of the laser is unacceptably high. For precision targeting applications, the location of the spot generated by the laser beam on the target must not be influenced by motion of the vehicle by variables such as, for example, aerodynamic disturbance. Unintended spot movement is commonly referred to as jitter in the context of high frequency errors and unintended spot movement is commonly referred to as pointing error in the context of low frequency or constant errors. A gimbal system itself is designed to reject disturbances and provide a stabilized platform for the payload assets.

Stabilization requirements for a laser, particularly those used for pointing/designating purposes, exceed the stabilization capability achievable by relatively small two-axis gimbal systems (e.g., those with a gimbal diameter of less than about 5"). This problem is sometimes overcome in larger gimbal systems by using additional nested axis subassemblies. These additional nested axis subassemblies can null-out disturbances not rejected by the subassemblies of outer axes. However, high-count nested axis gimbal system configurations are undesirable and/or unsuitable in many applications (e.g., small UAV applications) because they are too heavy and large for such applications. Therefore, a 2-axis gimbal system that is relatively small and that offers stabilization of gimbal systems with additional nested axis subassemblies would be advantageous, desirable and useful.

SUMMARY OF THE DISCLOSURE

Embodiments of the present invention are directed to a relatively small 2-axis gimbal system (e.g., a gimbal diameter of less than about 5") that offers stabilization of larger gimbal systems with additional nested axis subassemblies. More specifically, gimbal systems configured in accordance with the present invention offer stabilization that is suitable for laser pointing/designating applications. For example, in one specific embodiment of the present invention, the payload of such a relatively small 2-axis gimbal system includes a laser and a fast-steering mirror in the optical path of the laser. Advantageously, the fast steering mirror provides additional disturbance rejection by moving the laser output with respect to the elevation subassembly thereby enabling jitter thresholds for laser marking/designating applications to be met. To further enhance performance and packaging optimization, gimbal systems configured in accordance with the present invention can implement the laser orientation consistent with the aforementioned Coudé path in which the laser beam is passed from the azimuth subassembly to the elevation subassembly along rotational axis of the elevation subassembly. With this laser path implementation, the laser beam incoming to the elevation subassembly is advantageously in generally the same location regardless of the angle of rotation of the elevation subassembly such that it remains boresighted to the other payload assets.

In preferred embodiments of the present invention, the laser is placed in the azimuth subassembly as it provides suitable volume for packaging as well as a suitable surface area for required heat dissipation. In a relatively small gimbal system, it is a challenge to package the relatively long laser cavity in the axis of the elevation subassembly, which is generally spherical-shaped and tightly packaged with imaging sensors. Thus, by packaging the laser in the "arm" of the azimuth subassembly places it in direct contact to the exterior skin of the gimbal system, where forced convection cooling from the relative motion apparatus on which it is mounted (e.g., a UAV) through the air can remove heat from the laser.

In preferred embodiments, the fast steering mirror is positioned at the turn or 'fold' of the laser beam between the elevation axis and the line-of-sight of the payload assets. This location is advantageous in that it is beneficial for the laser beam interface to the elevation subassembly to be constant and it is beneficial for the fast steering mirror to precede a telescope asset of the payload in order to minimize the mirror size.

In preferred embodiments, the fast steering mirror can be used to normalize any pointing error introduced by variation in the payload optical system in addition to reducing jitter. There can be fixed errors due to, for example, irregularities in the construction and mounting of the telescope. There can be position-based errors due to, for example, misalignment of the elevation axis to the beam running between the azimuth and the elevation. There can be dynamic errors due to, for example, vibration or thermal expansion. Through use of a sensing system intended to detect theses types of errors, self-correction can be implemented for errors that are within the bandwidth of the fast steering mirror in a manner that provides for lower cost manufacturing and calibration methods.

In one specific embodiment of the present invention, a two-axis gimbal system comprises a gimbal assembly, a laser, a first laser light beam steering device, a second laser light beam steering device, and a micro-electro-mechanical system (MEMS) gyro. The gimbal assembly includes a base subassembly, an azimuth subassembly having a rotatably mounted on the base subassembly in a manner enabling the azimuth subassembly to rotate about a first rotational axis, and an elevation subassembly rotatably mounted on the azimuth subassembly in a manner enabling the elevation subassembly to rotate about a second rotational axis. The second rotational axis extends substantially perpendicular to the first rotational axis. The laser and the first laser light beam steering device mounted on the azimuth subassembly. The first laser light beam steering device redirects a laser light output of the laser from a first laser light beam travelling direction to a second laser light beam travelling direction. The second laser light beam travelling direction is substantially along the second rotational axis. The second laser light beam steering device is mounted on the elevation subassembly for redirecting the laser light output from along the second laser light beam travelling direction to along a third laser light beam travelling direction. The MEMS gyro is mounted on the elevation subassembly.

In another specific embodiment of the present invention, a two-axis gimbal system comprises a gimbal assembly, a laser assembly, a fast steering mirror, a short wavelength infrared (SWIR) camera, and a micro-electro-mechanical system (MEMS) gyro. The gimbal assembly includes a base subassembly, an azimuth subassembly having a rotatably mounted on the base subassembly in a manner enabling the azimuth subassembly to rotate about a first rotational axis, and an elevation subassembly rotatably mounted on the azimuth subassembly in a manner enabling the elevation subassembly to rotate about a second rotational axis. The second rotational axis extends substantially perpendicular to the first rotational axis. The laser assembly is mounted on the azimuth subassembly. The laser assembly includes a laser light beam steering device that redirects a laser light output of a laser of the laser assembly from a first laser light beam travelling direction to a second laser light beam travelling direction. The second laser light beam travelling direction is substantially along the second rotational axis. The fast steering mirror is mounted on the elevation subassembly for redirecting the laser light output from along the second laser light beam travelling direction to along a third laser light beam travelling direction. The SWIR camera and the MEMS gyro are mounted on the elevation subassembly. The beam stabilization circuitry is mounted on the gimbal assembly. The beam stabilization circuitry is coupled to an output signal of the MEMS gyro, to an output signal of the SWIR camera, to an input signal of a gimbal subassembly movement apparatus of the azimuth subassembly and to an input signal of a gimbal subassembly movement apparatus of the elevation subassembly.

In view of the disclosures made herein, a skilled person will appreciate that gimbal systems configured in accordance with the present invention address a number of problems with other configurations of gimbal assemblies. One such problem is the inability to use lightweight vehicles for target identification. Another such problem is the inability to identify/designate targets with high accuracy over a range of environments. Another such problem is the unreliability/instability of high power lasers due to thermal irregularities. Still another such problem is the inability to actively correct misalignment between a camera line of sight and a laser line of sight.

These and other objects, embodiments, advantages and/or distinctions of the present invention will become readily apparent upon further review of the following specification, associated drawings and/or appended claims.

DETAILED DESCRIPTION OF THE DRAWING FIGURES

Figure 1:
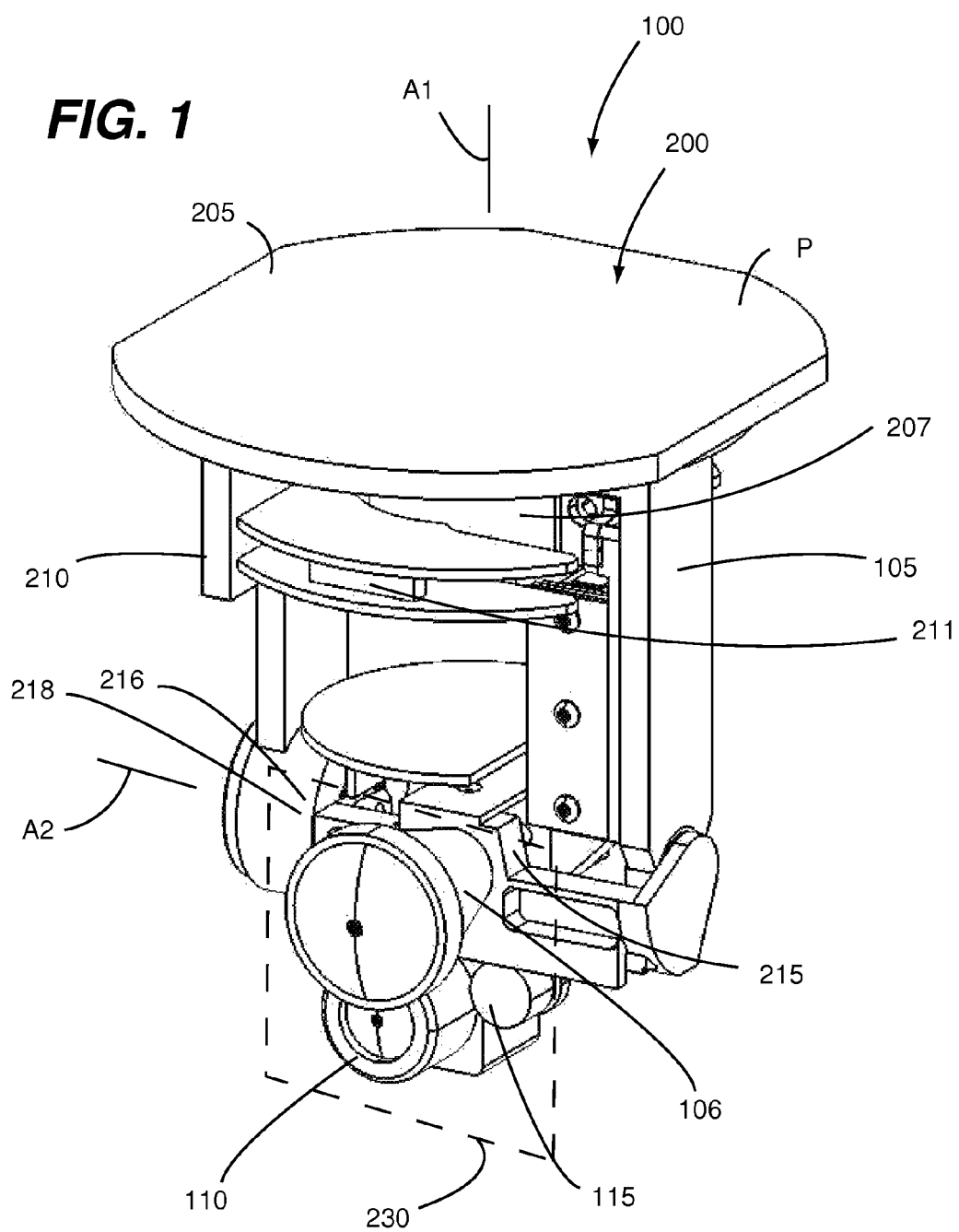
FIG. 1 is an illustrative view showing an embodiment of a 3-inch gimbal system configured in accordance with an embodiment of the present invention.
Figure 2:
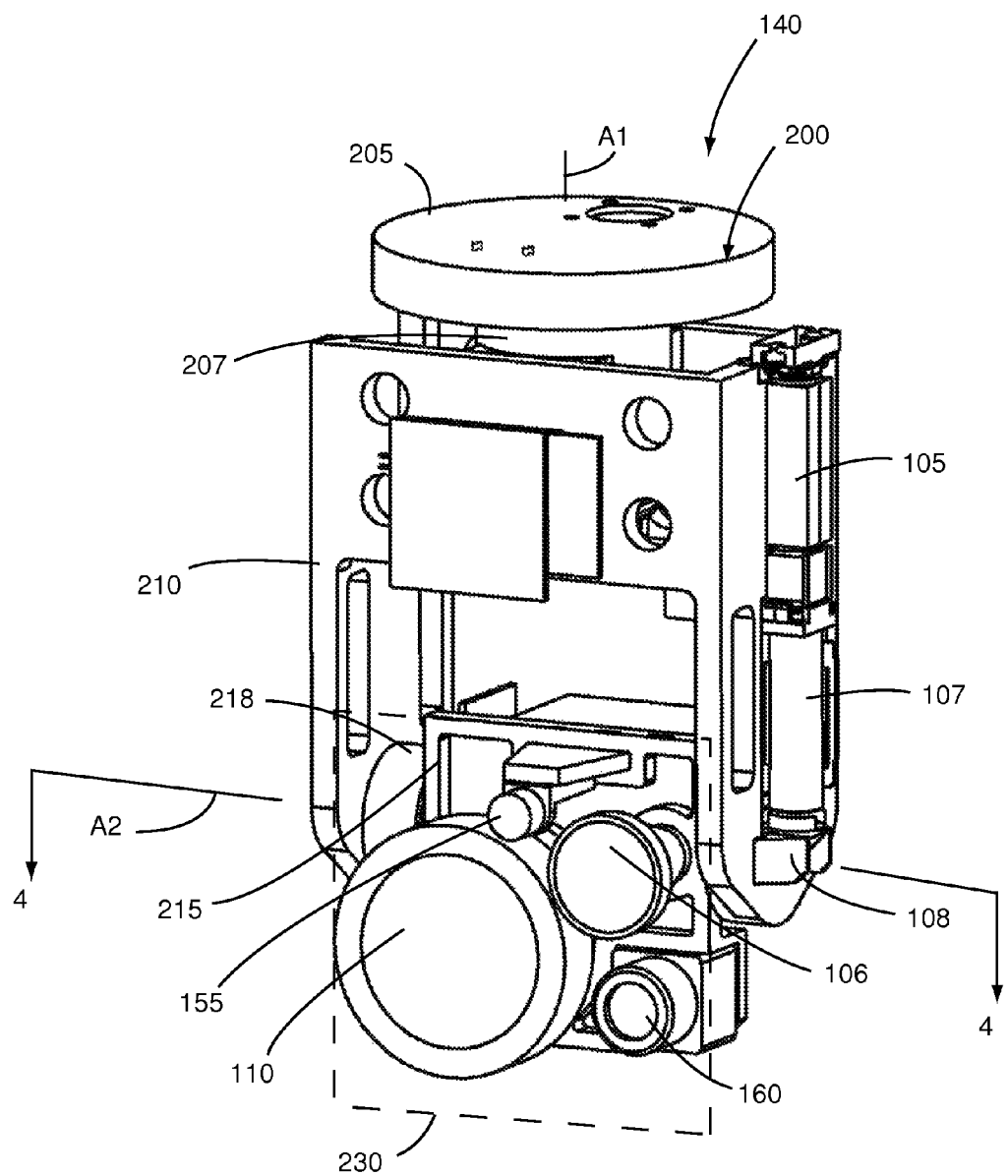
FIG. 2 is an illustrative view showing an embodiment of a 5-inch gimbal system configured in accordance with an embodiment of the present invention.

FIGS. 1 and 2 show various aspects of gimbal systems configured in accordance with embodiments of the present invention. FIG. 1 shows a 3-inch gimbal system 100 (i.e., a gimbal diameter of about 3 inches) having a payload asset package including a laser assembly 105 (with laser beam output portion 106 (e.g., a beam expander/telescope)), a short-wave (i.e., short wavelength) infrared (SWIR) device 110 (e.g., a SWIR camera servicing as a laser light detecting device) and an electro-optical (EO) camera 115. FIG. 2 shows a 5-inch gimbal system 140 (i.e., a gimbal diameter of about 5 inches) having a payload asset package including a laser assembly 105 (with laser beam output portion 106), a short-wave infrared (SWIR) device 110, a illuminator 155 (e.g., SWIR illuminator) and a long-wave (i.e., long wavelength) infrared (LWIR) device 160 (e.g., a LWIR camera servicing as a laser light detecting device). The 3-inch gimbal system 100 and the 5-inch gimbal system 140 both have a two-axis azimuth over elevation (i.e., az-over-el) gimbal arrangement. In this regard, the 3-inch gimbal system 100 and the 5-inch gimbal system 140 both offer a low number of pivot axes corresponds to an overall construction that can offer relatively low weight. As discussed below, gimbal systems configured in accordance with the present invention are configured for overcoming inherent limitations of a gimbal with only 2 pivot axes to provide pointing performance not previously attainable with a two-axis azimuth over elevation gimbal of a relatively small size (e.g., a 3 or 5 inch diameter gimbal).

As shown in FIGS. 1 and 2, a two-axis el-over-az gimbal 200 of the 3-inch gimbal system 100 and the 5-inch gimbal system 140 consists of three main subassemblies—a base subassembly 205, an azimuth subassembly 210 and an elevation subassembly 215. The base subassembly 205 (i.e., a gimbal base structure of the gimbal 200) provides mounting features and interconnect to a vehicle or other form of apparatus on which it is installed and, thus, the base subassembly 205 is fixed with respect to the vehicle. The azimuth subassembly 210 (i.e., a gimbal azimuth structure of the gimbal 200) rotates about the base subassembly 205, along an azimuth subassembly rotational axis A1 that is normal to the primary mounting plane P of the base subassembly 205. A first gimbal subassembly movement apparatus 207 is coupled between the base subassembly 205 and the azimuth subassembly 210 for enabling precision motion control of the azimuth subassembly 210 with respect to the base subassembly 205. For example, the first gimbal subassembly movement apparatus 207 can include an azimuth subassembly motor (e.g., direct drive torque motors (i.e., torquers)) mechanically coupled between the base assembly 205 and the azimuth subassembly 210 and control circuitry coupled to the azimuth subassembly motor. The elevation subassembly 215 (i.e., a gimbal elevation structure of the gimbal 200) is supported by the azimuth subassembly 210 and rotates about an elevation subassembly rotational axis A2 that is normal to the azimuth subassembly rotational axis A1 of the azimuth subassembly 210. Each one of the pivoting gimbal subassemblies (i.e., the azimuth subassembly 210 and the elevation subassembly 215) is a nested axis subassembly of the gimbal 200. A second gimbal subassembly movement apparatus 218 is coupled between the azimuth subassembly 210 and the elevation subassembly 215 for enabling precision motion control of the elevation subassembly 215 with respect to the azimuth subassembly 210. For example, the second gimbal subassembly movement apparatus 218 can include an elevation subassembly motor (e.g., direct drive torque motors (i.e., torquers)) mechanically coupled between the azimuth subassembly 210 and the elevation subassembly 215 and control circuitry coupled to the elevation subassembly motor. It is disclosed herein that the azimuth subassembly 210 can include an angular position sensor 211 for sensing angular position about the azimuth subassembly rotational axis A1 and the elevation subassembly 215 can include an angular position sensor 216 for sensing angular position about the elevation subassembly rotational axis A2. In this regard, the angular position sensors 211, 216 can enable slew-to-cue via command from host vehicle, or for reporting pointing angles to host vehicle, and when used with LRF and INS/GPS in host vehicle for performing target geo-location.

The elevation subassembly 215 of each one of the gimbal assemblies 100, 140 has a payload 230 (see FIGS. 1 and 2) provided thereon. The payload 230 includes a suite of sensors and/or indicators (i.e., payload assets), such as for example cameras, laser range finders (LRFs), and laser pointers/markers/designators. The payload assets of the payload 230 with a line of sight are typically pointed or pointable such that lines of sight thereof (e.g., of the sensors and indicators) are in a direction normal to the rotational axis A2 of the elevation subassembly 215. This allows the payload assets to be directed in an arbitrary direction by moving the azimuth subassembly 210 and the elevation subassembly 215. Furthermore, the payload assets of the payload 230 are typically pointed such that their lines of sight are or can be overlapping such that all of the payload assets have or can have their line of sight trained on a common reference point/object (i.e., simultaneous vision of a common target). The laser is generally aligned to this common reference point/object and can be precisely aligned to (i.e., pointed at) this common reference point/object via a beam steering device.

As shown in FIGS. 1-4, the laser assembly 105 (e.g., light emitting unit 107 and a first beam steering device 108 (e.g., prism)) can be configured to have a Coudé path in which the laser beam passes from the azimuth subassembly 210 to the elevation subassembly 215 along the elevation subassembly rotational axis A2. In this arrangement, the light emitting unit 107 and the first beam steering device 108 are mounted on the azimuth subassembly 210 and a second beam steering device 111 (e.g., a FSM) and beam output portion 106 are mounted on the elevation subassembly 215. The first laser light beam steering device 108 redirects a laser light output 113 of the laser 107 from a first laser light beam travelling direction (e.g., parallel to the azimuth subassembly rotational axis A1) to a second laser light beam travelling direction (i.e., along the elevation azimuth subassembly rotational axis A2). The second laser light beam steering device 111 redirects the laser light output 113 from along the second laser light beam travelling direction to along a third laser light beam travelling direction A3 (e.g., approximately perpendicular to the elevation azimuth subassembly rotational axis A2). Through such a path arrangement, the laser light output 113 (i.e., laser beam) incoming to the elevation subassembly 215 is in generally the same location regardless of the angle of rotation of the elevation subassembly 215. The laser assembly 105 can be mounted on the azimuth subassembly 210 in an inboard arrangement (shown in FIG. 1) or on the azimuth subassembly in an outboard arrangement (shown above in FIG. 2). The laser beam output portion 106 can be configured to increase a cross sectional area of the laser beam (i.e., collimate light beam 117).

As discussed below in greater detail, a gimbal system suitably configured to provide precision payload asset (e.g., laser) steering functionality (e.g., the 3-inch gimbal system 100 and the 5-inch gimbal system 140) is one embodiment of the present invention. Such a gimbal system has particular applicability for use on small unmanned aerial vehicles (UAVs). The ability to provide precision payload asset steering functionality is provided through integration of an inertially stabilized two-axis gimbal in combination with the beam stabilization mechanism (BSM).

Figure 5:
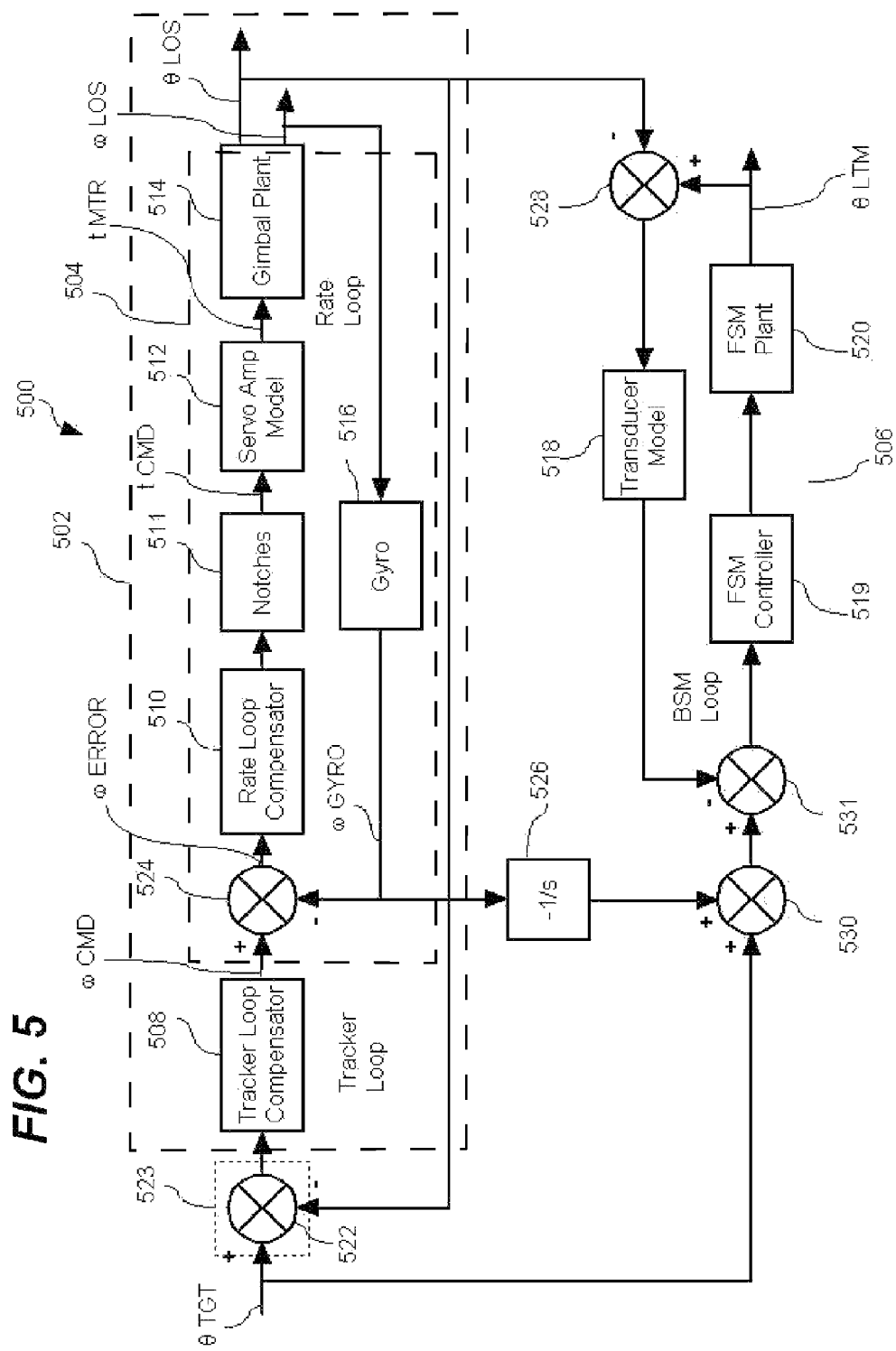
FIG. 5 is a diagrammatic view showing a gyro-feed forward control module configured in accordance with an embodiment of the present invention.
Figure 6:
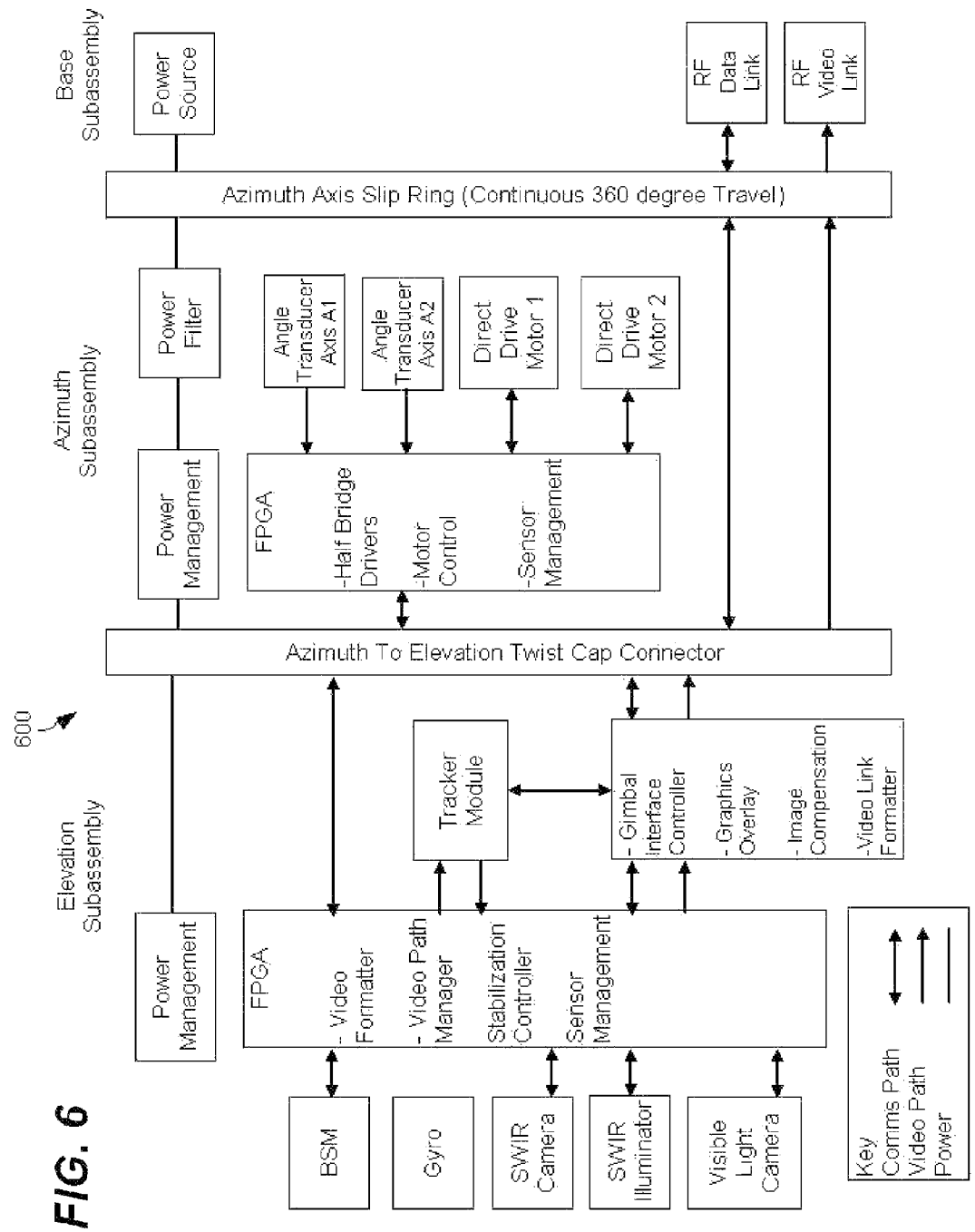
FIG. 6 is a block diagram showing a gimbal system electronics architecture configured in accordance with an embodiment of the present invention and suitable for use in a gimbal system configured in accordance with an embodiment of the present invention.

The purpose of the BSM is to attenuate any residual disturbances imparted upon the gimbal system. In addition to maintaining a highly stable laser beam, the laser is required to maintain tight pointing accuracy to properly mark (i.e., designate) targets. In one embodiment, the BSM comprises a low-latency target tracker apparatus, a beam steering device, and a gyro-feed forward control module (e.g., gimbal single axis control loop). Low-latency target tracker apparatuses of various implementations are well-known. In the context of embodiments of the present invention, a skilled person will appreciate that it is preferred to implement a target tracker apparatus having a maximum latency of about one frame per one-thirtieth of a second (i.e., a low-latency target tracker apparatus) and that the target tracker apparatus is capable of tracking targets with imaging provided by a EO camera and/or SWIR camera and/or LWIR camera. An example of the gimbal single axis control loop (i.e., beam stabilization circuitry) is shown in FIG. 5. A Fast Steering Mirror (FSM) is an example of the beam steering device. FIG. 6 shows an embodiment of a gimbal payload having a compact FSM implementation. As disclosed above, a gimbal system comprises a gimbal (e.g., gimbal base, gimbal, azimuth structure, elevation structure) with associated components attached thereto (e.g., payload assets).

The control system for the FSM can determine the desired mirror position using a number of sensing paths. Gyroscopes and accelerometers can be used to detect motion of the elevation subassembly. The FSM can null out that motion thereby fixing the laser beam spot location. A video imaging device (e.g., of the target tracker apparatus) can be used to monitor target movement with respect to the line of sight. The FSM can adjust the beam output to correspond to that motion thereby keeping the laser beam spot on the target. If the elevation axis angle is observed, for example with an encoder, and the pointing error due to elevation axis position has been mapped and recorded, the FSM can null that error. If an optical sensor (e.g., a position-sensing photodiode) is stimulated by a beam (e.g., a high power laser or a smaller reference beam) that originated in the azimuth subassembly and has been relayed by the FSM, errors in the majority of the optical system can be captured and driven to null. Furthermore, the FSM can include mirror position detectors that can provide feedback to the control system to ensure the mirror is correctly positioned.

As shown in FIG. 5, a gimbal single axis control loop 500 includes a target tracker (i.e., tracker) loop 502 (i.e., loop providing a tracker feedback signal), a rate loop 504 (i.e., loop providing a rate feedback signal) and a BSM loop 506 (i.e., loop providing a BSM feedback signal). The rate loop 504 is nested within the tracker loop 502. The BSM loop 506 is connected to outputs of the tracker loop 502 and the rate loop 504. The tracker loop 502 receives a single gimbal axis (e.g., azimuth rotational axis or elevation rotational axis) pointing command ($\theta$ Target) that is relative to a host platform (e.g., a UAV) on which a gimbal system comprising the gimbal single axis control loop 500 is mounted. Based on the single gimbal axis pointing command (i.e., theta ($\theta$) Target, the tracker loop 502 results in modifying the single gimbal axis angle (i.e., theta LOS) and the BSM loop 504 results in modifying the single axis beam-steering mechanism angle. (i.e., theta LTM).

The gimbal single axis control loop 500 serves a single gimbal subassembly. Accordingly, in one embodiment, a 2-axis gimbal system will require implementation of two gyro-feed forward control modules (i.e., beam stabilization circuitry including, for example, two instances of the gimbal single axis control loop 500). Specifically, for example, a first instance of the gimbal single axis control loop 500 can serve the azimuth gimbal subassembly 210 and a second instance of the gimbal single axis control loop 500 can serve the elevation gimbal subassembly 215.

The tracker loop 502 is defined by a control loop path through a tracker loop compensator 508, a rate loop compensator 510, notches function 511, a servo amp model 512, and through a gimbal plant 514. The rate loop 504 is defined by a control loop path through a gyro model 516, the rate loop compensator 510, the notches function 511, the servo amp model 512 and the gimbal plant 514. The BSM loop 506 is defined by a control loop path through a transducer model 518, a FSM controller 519, and a FSM plant 520.

The tracker loop compensation 508 provides the tracker dynamics compensation required to achieve desired closed-tracker-loop performance of the gimbal system. The rate loop compensator 510 provides the inertial rate feedback loop the compensation required to achieve desired closed-rate-loop performance of the gimbal system. The notches function 511 provides for filtering to achieve adequate gain and phase margin at structural resonances. The servo amp model 512 represents the closed-loop dynamics of a torque-loop controlled motor (e.g., direct-drive torquer) and motor amplifier of the gimbal system. The gimbal plant 514 represents inertial dynamics of a physical portion of the gimbal assembly that is under control of the rate loop 504. The gyro model 516 represents dynamics and non-linear effects of a gyroscope of the gimbal system and associated processing. The transducer model 518 represents the dynamics and non-linear effects of a relative beam steering angle sensor. The FSM controller 519 provides for FSM loop compensation and FSM interface. The FSM plant 520 represents inertial dynamics of a physical portion of the FSM that is under control of the BSM loop 506.

The single gimbal axis pointing command ($\theta$ TGT) is provided to a first summing junction 522, which is that of a target tracker 523, subtracts an output of the tracker loop (the gimbal LOS angle) from the single gimbal axis pointing command ($\theta$ LOS). In one embodiment of the present invention, a target tracker comprises a video algorithm that computes a pointing error between the gimbal angle and the estimated target angle relative to the host platform. This pointing error, which is the first summation junction 522, is driven to zero by a feedback loop whose dynamics and response are modified by the tracker loop compensator 508. Output of the first summing junction 522 (i.e., θ TGT minus θ LOS) is provided to the tracker loop compensator 508. Output of the tracker loop compensator 508 (i.e., omega (ω) CMD which is a rate command to the rate loop) is provided to a second summing junction 524 that subtracts an output of the tracker loop from output of the gyro 516 (i.e., ω GYRO). Output of the second summing junction 524 (i.e., ω ERROR, which is rate error between a commanded rate and a gyro sensed rate) is provided to the rate loop compensator 510 and output of the rate loop compensator 510 is provided to the notches function 511. Output of the notches function 511 (i.e., t CMD, which is torque command to the gimbal motor) is provided to the servo amp 512. Output of the servo amp 512 (i.e., t MTR, which is the torque generated by one of the gimbal motors) acts on the gimbal plant 514, thereby causing outputs from the rate loop 504 and the tracker loop 502. A first output of the tracker loop 502 (i.e., theta LOS) is provided to the first summing junction 522 (i.e., the gimbal pointing angle) and a second output of the tracker loop 502 (i.e., ω LOS, which is the inertial gimbal rate) is provided to gyro model 516.

Output of the gyro model 516 (i.e., ω GYRO) and output of the tracker loop 502 and the rate loop 504 (i.e., θ LOS) are inputs into the BSM loop 506. Output of the rate loop 504 is provided to an integrator 526 and output of the tracker loop 502 is provided to a third summing junction 528. Output of the integrator 526 and the single gimbal axis pointing command (θ TGT) are provided to a fourth summing junction 530, which sums the output of the integrator 526 and the single gimbal axis pointing command (θ TGT). Output of the fourth summing junction 530 and output of the transducer model 518 are provided to a fifth summing junction 531, which subtracts the output of the transducer model 518 from the output of the fourth summing junction 530. Output of the fifth summing junction 531 is provided to the FSM controller 519 and output of the BSM loop 506 is a single axis beam-steering mechanism angle (i.e., theta LTM). This is also provided to the third summing junction 528 which represents the relative angle measurement between the gimbal angle (θ LOS) and the laser angle (θ LTM), whose dynamics are modelled by the transducer model 518. In this regard, the BSM (i.e., via BSM loop 506) attempts to drive an angle error term to zero. The error term is the difference between the angle command (relative to the gimbal) based on integrated gyro rate, and the relative BSM angle. Additionally, the target tracker command is summed with the integrated gyro rate (i.e., at the fourth summing junction 530) to allow the BSM to not only reject torque disturbances but to also accurately follow the target tracker command.

A gimbal system that is suitably configured to provide precision laser steering functionality in accordance with the present invention (e.g., the 3-inch gimbal system 100 and the 5-inch gimbal system 140) has a plurality of unique characteristics. One example of such a characteristic is a 3-inch to 5-inch diameter gimbal for UAV's (e.g., hand launched (HLUAV) or tube launched (TLUAV)) with a payload and gimbal weight of 1.8 and 5 pounds, respectively, for the 3-inch gimbal and the 5-inch gimbal. Another example of such a characteristic is packaging of a passive (e.g., a HLUAV gimbal) or an active (e.g., a TLUAV gimbal) Q-switched laser marker/designator in a small gimbal envelope using the Coudé path for the laser beam. Another example of such a characteristic is packaging of a multi-spectral suite of imaging sensors (i.e., payload assets) such as, for example, a short-wave infrared (SWIR) device, a long-wave infrared (LWIR) device, a color night vision (CNV) device, and/or a visible wavelength device. Another example of such a characteristic is using an imaging sensor capable of detecting a distant target in combination with a laser spot on a target to increase designating safety. Another example of such a characteristic is continuous 360-degree azimuth coverage with elevation covering a minimum of +30 degrees to −110 degrees where axes are capable of slewing at least 200 degrees per second. Yet another example of such a characteristic is holding 25 μrad RMS laser stabilized spot on a target under typical small UAV motion. Examples of approaches for achieving such 25 μrad RMS laser stabilized spot accuracy include, but are not limited to, using a high-bandwidth gyro feed-forward control to attenuate residual gimbal disturbances, packaging a fast-steering mirror (FSM) within the size and weight constraints of a small UAV, and integrating FSM with low-latency, high-bandwidth image based target tracker to command the beam onto the target.

Figure 3:
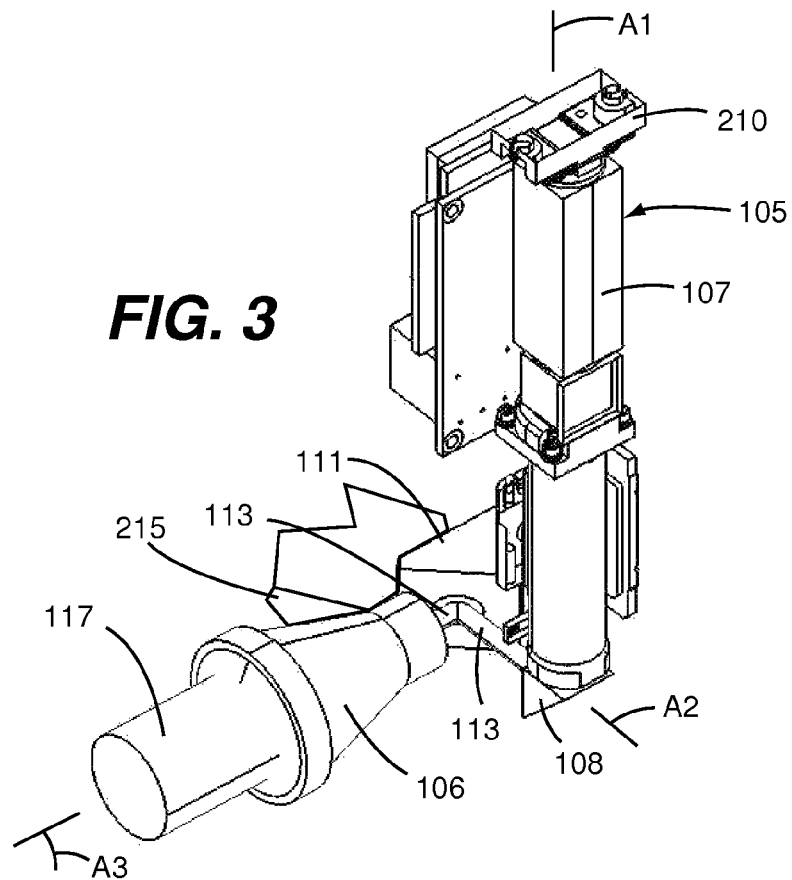
FIG. 3 is an illustrative view of a gimbal system configured in accordance with an embodiment of the present invention and having a Coudé path implemented laser arrangement.
Figure 4:
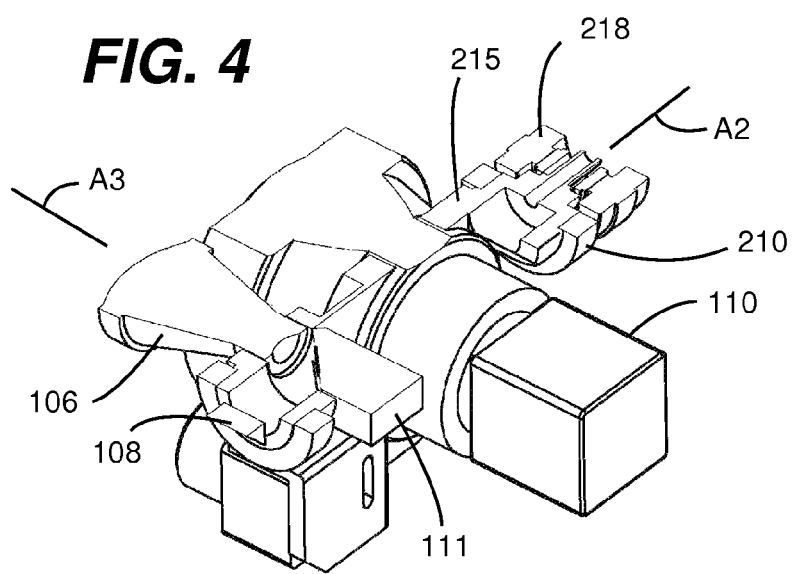
FIG. 4 is a cross-sectional view taken along the line 4-4 in FIG. 2.

Long focal length optics, which are typically required for target identification, generally make up the majority of the payload volume. In certain embodiment of the present invention, the laser and drive electronics are housed in the azimuth subassembly. The laser beam can be relayed into the elevation subassembly along the elevation subassembly axis of rotation using a folding prism. As shown in FIGS. 3 and 4, a beam steering device (e.g., a compact FSM or prism) mounted on the elevation subassembly 215 folds the laser beam from the elevation subassembly axis of rotation to the line of sight (LOS). A beam expander (e.g., the beam output portion 106) can be used to reduce divergence of the laser beam. Advantageously, by placing the bean steering device before the beam expander, a very small mirror and correspondingly, when the beam steering device mounted on the elevation subassembly is a FSM, this enables relatively small movement actuators to be used for the FSM.

In addition to the payload, gimbal systems configured in accordance with the present invention can comprise gyros and electronics. For example, operation of such gimbal systems requires a relatively small gyro (e.g., a micro-electro-mechanical system (MEMS) gyro). The gyro must offer suitable performance in regard to operating requirements such as, for example, line of sight (LOS) jitter. Performance of such operating parameters can be characterized by a number of payload asset parameters. Examples of these payload operating parameters include, but are not limited to, sensor bandwidth, sensitivity, noise, and drift.

FIG. 6 shows a gimbal system electronics architecture 600 configured in accordance with an embodiment of the present invention. The gimbal system electronics architecture of FIG. 6 is particularly suited for a 5" gimbal configured in accordance with the present invention. As shown, the partitioning of the electronics is fundamentally based on available space for electronics and the likely location of the gimbal actuators. The laser designator is preferably, but not necessarily, in the azimuth gimbal subassembly because of its size and for thermal management purposes. The core electronics of the gimbal system electronics architecture are preferably configured to have high design reuse as gimbal size scales up and down. For relatively smaller gimbals, the payload selection will be more limited and can also result in partitioning and interconnect changes. For the highest reuse design, the electronics will generally benefit from a standardized UAV communication link interface such as for command/control and for video downlink. In this architecture, a first processing device (e.g., a first Texas Instruments model no DM3730 processor) is set aside to accommodate an appropriate performance tracker. A second processing device (e.g., a second Texas Instruments model no DM3730 processor) provides the primary processing requirements for the gimbal control and for the video formatting for the video downlink (e.g., interlaced analog, up to 720p H.264 compressed video streamed over Ethernet, LVDS or HDMI/DVI type raw serialized video stream).

With regard to a gimbal system having a gimbal diameter of about 3" or less (i.e., a relatively small gimbal system), packaging of the laser can require more highly integrated optics and a reduced payload with regard to a gimbal system having a larger gimbal diameter (e.g., a gimbal diameter of up to about 5"). For such a relatively small gimbal system, the payload can consist of only the FSM, the SWIR camera, and the illuminator. In this regard, the LWIR and corresponding long focal length optics common to a larger gimbal system can be omitted while the overall configuration of the gyro, encoder and torquer layout is maintained.

A gimbal system suitably configured to provide precision laser steering functionality in accordance with the present invention can include a Near Infrared (NIR) laser. Alternatively or simultaneously, a gimbal system suitably configured to provide precision laser steering functionality in accordance with the present invention can include a pulsed laser outputting light at a wavelength of about 1064 nm. The gimbal system would have its thermal dissipation attributes suitably configured for laser components such as the pump diodes.

A gimbal system suitably configured to provide precision laser steering functionality in accordance with the present invention preferably, but not necessarily, provides for integration of a compact FSM. In preferred implementations, optical architecture selected for the stabilized laser allows for a relatively small aperture (e.g., about a 4 mm diameter) on the FSM. As a result of this relatively small aperture, it is possible to create an FSM that is correspondingly compact through use of suitable actuation and sensing methods. Reducing the size of the FSM creates opportunities to reduce the overall size of the gimbal system and/or to repurpose the volume for other payload assets. Size reduction can also reduce the power consumed by the FSM.

In some embodiments, a gimbal system configured in accordance with the present invention will have a form factor that allows for placement and integration of multiple payload assets. More specifically, a gimbal system suitably configured to provide precision laser steering functionality in accordance with the present invention preferably, but not necessarily, provides for integration of multiple imaging sensors. Using multiple image sensors requires a multiplexing video path to accommodate a single video source target tracker. Using very high speed serial transmission allows for the use of a compact, low signal count, 'twist cap' configuration for interconnect between the azimuth and elevations subassemblies. Advantageously, the reduced volume allocation for wiring allows packaging of larger payload assets (e.g. longer focal length of an imaging asset) for improved detection performance. Examples of payload assets useful in a gimbal system configured in accordance with the present invention include, but are not limited to, a low light visible (e.g. CNV) camera that can be used for situational awareness or as a 'see spot' detector when an invisible light (e.g., 1064 nm wavelength) laser is used for target designation, a SWIR camera having a long focal length lens that is used for detection and verification, IR illumination and/or pointing laser, a LWIR camera for situational awareness and low-light targeting, and a laser range finder (LRF) receiver whose transmission could be done by the designating laser operating in an alternate mode.

A gimbal system configured in accordance with the present invention must provide for suitable thermal management of heat generated by the payload. In particular, the thermal management for high power density payload assets requires significant thermal design considerations to ensure acceptable performance and reliability of the gimbal system components. To this end, gimbal system configured in accordance with the present invention can be configured such that the direct conduction cooling is provided for payload assets requiring significant heat dissipation. In one particular implementation, thermal energy from payload assets is routed to a thermally conductive (e.g., aluminium) skin of the gimbal assembly in a manner where convection cooling enables such payload assets to operate at a suitable temperature range such as, for example, that which is specified by military standard MIL-STD-810.

The heat sources of greatest concern are the laser drive electronics and the laser cavity itself. These gimbal system components can be configured to reject heat by conduction through a heat sink plate on one side. The heat sink plates are preferably oriented to be as close to the exterior of the gimbal system as possible. Other sources of heat can be configured to reject heat by conduction through the mounting structure to the surface of the respective gimbal subassembly.

The bearing configuration of each gimbal subassembly axis is selected to minimize friction, particularly in slow, oscillating motion, while maintaining a high overturning stiffness. To this end, in preferred implementations, brushless torquers and encoders are employed on each gimbal subassembly axis (e.g., respectively within the first and second gimbal subassembly movement apparatuses 207, 218 discussed above in reference to FIGS. 1-4). Furthermore, interconnect on the azimuth subassembly axis can be achieved using a compact slip ring to allow for continuous rotation and interconnect across the elevation subassembly axis can be achieved using a highly integrated twist cap with a travel of, for example, 270° objective and 220° threshold.

Another design consideration of gimbal systems configured in accordance with the present invention relates to environmental sealing considerations. For example, in the case of a gimbal system having immersion sealing requirements, relatively large friction to inertia ratio inherent to small gimbals must be taken into consideration to ensure that gimbal stabilization requirements are met.

It is disclosed herein that a gimbal system configured in accordance with the present invention can be used in a variety of applications besides unmanned air vehicles. One such application is cinematography. In this particular use, it can be beneficial for the gimbal system to include one or more additional nested axis subassemblies (i.e., in addition to the gimbal elevation structure and the gimbal azimuth structure). Another such application is optical image motion compensation (IMC) for airborne LWIR targeting applications. In this particular use, a plurality of linear push pull actuators and a plurality of inductive sensors can be used to control an aspheric mirror in both elevation and azimuth axes. Furthermore, the IMC can be configured to optically compensated for base motion disturbances not rejected by the primary gimbal system (e.g., a rejection ratio of 5:1). Another such application is basic pan and tilt functionality in which a 2-axis gimbal system has a payload comprising a high-resolution visible camera. As an example, such a gimbal system can be configured to offer a slewing rate of up to about 800 deg/s with a full 360° continuous azimuth rotation and +30°/−60° elevation rotation.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of any appended claims.

What is claimed is:

1. A two-axis gimbal system, comprising:
   a gimbal assembly including a base subassembly, an azimuth subassembly having a rotatably mounted on the base subassembly in a manner enabling the azimuth subassembly to rotate about a first rotational axis, and an elevation subassembly rotatably mounted on the azimuth subassembly in a manner enabling the elevation subassembly to rotate about a second rotational axis, wherein the second rotational axis extends substantially perpendicular to the first rotational axis;
   a laser mounted on the azimuth subassembly;
   a first laser light beam steering device amounted on the azimuth subassembly, wherein the first laser light beam steering device redirects a laser light output of the laser from a first laser light beam travelling direction to a second laser light beam travelling direction and wherein the second laser light beam travelling direction is substantially along the second rotational axis;
   a second laser light beam steering device mounted on the elevation subassembly for redirecting the laser light output from along the second laser light beam travelling direction to along a third laser light beam travelling direction, wherein the second laser light beam steering device includes a fast steering mirror (FSM); and
   a micro-electro-mechanical system (MEMS) gyro mounted on the elevation subassembly.

2. The two-axis gimbal system of claim 1, further comprising:
   a laser light detecting device mounted on the elevation subassembly.

3. The two-axis gimbal system of claim 2 wherein the first laser light detecting device includes a first camera configured to detect electromagnetic radiation within a specified infrared light wavelength range.

4. The two-axis gimbal system of claim 2, further comprising:
   a second camera mounted on the elevation subassembly, wherein the second camera is configured to detect electromagnetic radiation that is not detectable by the first camera.

5. The two-axis gimbal system of claim 3, further comprising:
   an infrared light illuminator mounted on the elevation subassembly, wherein the infrared light illuminator configured to emit electromagnetic radiation within the specified infrared light wavelength range.

6. A two-axis gimbal system, comprising:
   a gimbal assembly including a base subassembly, an azimuth subassembly having a rotatably mounted on the base subassembly in a manner enabling the azimuth subassembly to rotate about a first rotational axis, and an elevation subassembly rotatably mounted on the azimuth subassembly in a manner enabling the elevation subassembly to rotate about a second rotational axis, wherein the second rotational axis extends substantially perpendicular to the first rotational axis, wherein the gimbal subassembly movement apparatus of the azimuth subassembly and the gimbal subassembly movement apparatus of the elevation subassembly each include direct drive torque motors exerting rotational force on a respective one of the gimbal subassemblies;
   a laser mounted on the azimuth subassembly;
   a first laser light beam steering device amounted on the azimuth subassembly, wherein the first laser light beam steering device redirects a laser light output of the laser from a first laser light beam travelling direction to a second laser light beam travelling direction and wherein the second laser light beam travelling direction is substantially along the second rotational axis;
   a second laser light beam steering device mounted on the elevation subassembly for redirecting the laser light output from along the second laser light beam travelling direction to along a third laser light beam travelling direction; and
   a micro-electro-mechanical system (MEMS) gyro mounted on the elevation subassembly.

7. The two-axis gimbal system of claim 6 wherein:
the azimuth subassembly includes an angular position sensor for sensing angular position about the azimuth subassembly rotational axis; and
the elevation subassembly includes an angular position sensor for sensing angular position about the elevation subassembly rotational axis.

8. A gimbal system, comprising:
   a gimbal assembly including a base subassembly, an azimuth subassembly having a rotatably mounted on the base subassembly in a manner enabling the azimuth subassembly to rotate about a first rotational axis, and an elevation subassembly rotatably mounted on the azimuth subassembly in a manner enabling the elevation subassembly to rotate about a second rotational axis, wherein the second rotational axis extends substantially perpendicular to the first rotational axis;
   a laser mounted on the azimuth subassembly;
   a first laser light beam steering device amounted on the azimuth subassembly, wherein the first laser light beam steering device redirects a laser light output of the laser from a first laser light beam travelling direction to a second laser light beam travelling direction and wherein the second laser light beam travelling direction is substantially along the second rotational axis;
   a second laser light beam steering device mounted on the elevation subassembly for redirecting the laser light output from along the second laser light beam travelling direction to along a third laser light beam travelling direction;
   a micro-electro-mechanical system (MEMS) gyro mounted on the elevation subassembly; and
   a low-latency target tracker apparatus mounted on the gimbal assembly, wherein the low latency target tracker apparatus includes one or more target imaging cameras for generating target image information and wherein the one or more target imaging cameras are mounted on the elevation subassembly.

9. A two-axis gimbal system, comprising:
a gimbal assembly including a base subassembly, an azimuth subassembly having a rotatably mounted on the base subassembly in a manner enabling the azimuth subassembly to rotate about a first rotational axis, and an elevation subassembly rotatably mounted on the azimuth subassembly in a manner enabling the elevation subassembly to rotate about a second rotational axis, wherein the second rotational axis extends substantially perpendicular to the first rotational axis;
a laser mounted on the azimuth subassembly;
a first laser light beam steering device amounted on the azimuth subassembly, wherein the first laser light beam steering device redirects a laser light output of the laser from a first laser light beam travelling direction to a second laser light beam travelling direction and wherein the second laser light beam travelling direction is substantially along the second rotational axis;
a second laser light beam steering device mounted on the elevation subassembly for redirecting the laser light output from along the second laser light beam travelling direction to along a third laser light beam travelling direction;
a micro-electro-mechanical system (MEMS) gyro mounted on the elevation subassembly; and
a beam stabilization mechanism mounted on the gimbal assembly, wherein the beam stabilization mechanism is coupled to an output signal of the MEMS gyro, to an input signal of a gimbal subassembly movement apparatus of the azimuth subassembly and to an input signal of a gimbal subassembly movement apparatus of the elevation subassembly.

10. The two-axis gimbal system of claim 9 wherein:
the beam stabilization mechanism comprises a low-latency target tracker apparatus; and
the low latency target tracker apparatus includes one or more target imaging cameras for generating target image information; and
the one or more target imaging cameras are mounted on the elevation subassembly.

11. The two-axis gimbal system of claim 10, further comprising:
an infrared camera mounted on the elevation subassembly; and
a visible light camera mounted on the elevation subassembly;
wherein the low-latency target tracker apparatus comprises at least one of the infrared camera and the visible light.

12. The two-axis gimbal system of claim 11 wherein:
the beam stabilization mechanism comprises the second laser light beam steering device; and
the second laser light beam steering device includes a fast steering mirror (FSM).

13. The two-axis gimbal system of claim 12 wherein:
the gimbal subassembly movement apparatus of the azimuth subassembly and the gimbal subassembly movement apparatus of the elevation subassembly each include direct drive torque motors exerting rotational force on a respective one of the gimbal subassemblies;
the azimuth subassembly includes an angular position sensor for sensing angular position about the azimuth subassembly rotational axis; and the elevation subassembly includes an angular position sensor for sensing angular position about the elevation subassembly rotational axis.

14. A two-axis gimbal system, comprising:
a gimbal assembly including a base subassembly, an azimuth subassembly having a rotatably mounted on the base subassembly in a manner enabling the azimuth subassembly to rotate about a first rotational axis, and an elevation subassembly rotatably mounted on the azimuth subassembly in a manner enabling the elevation subassembly to rotate about a second rotational axis, wherein the second rotational axis extends substantially perpendicular to the first rotational axis;
a laser assembly mounted on the azimuth subassembly, wherein the laser assembly includes a laser light beam steering device that redirects a laser light output of a laser of the laser assembly from a first laser light beam travelling direction to a second laser light beam travelling direction and wherein the second laser light beam travelling direction is substantially along the second rotational axis;
a first camera mounted on the elevation subassembly, wherein the infrared light detecting camera is configured to detect electromagnetic radiation within a specified infrared light wavelength range;
an infrared light illuminator mounted on the elevation subassembly, wherein the infrared light illuminator configured to emit electromagnetic radiation within the specified infrared light wavelength range;
a second camera mounted on the elevation subassembly, wherein the second camera is configured to detect electromagnetic radiation within a specified visible light wavelength range;
a micro-electro-mechanical system (MEMS) gyro mounted on the elevation subassembly; and
a beam stabilization mechanism mounted on the gimbal assembly, wherein the beam stabilization mechanism includes a fast steering mirror mounted on the elevation subassembly for redirecting the laser light output from along the second laser light beam travelling direction to along a third laser light beam travelling direction and wherein the beam stabilization mechanism is coupled to an output signal of the MEMS gyro, to an output signal of the SWIR camera, to an input signal of a gimbal subassembly movement apparatus of the azimuth subassembly and to an input signal of a gimbal subassembly movement apparatus of the elevation subassembly.

15. The two-axis gimbal system of claim 14 wherein:
the beam stabilization mechanism includes a low-latency target tracker apparatus mounted on the gimbal assembly;
the low latency target tracker apparatus includes one or more target imaging cameras for generating target image information; and
the one or more target imaging cameras are mounted on the elevation subassembly.

16. The two-axis gimbal system of claim 15 wherein:
the gimbal subassembly movement apparatus of the azimuth subassembly and the gimbal subassembly movement apparatus of the elevation subassembly each include direct drive torque motors exerting rotational force on a respective one of the gimbal subassemblies;
the azimuth subassembly includes an angular position sensor for sensing angular position about the azimuth subassembly rotational axis; and the elevation subassembly includes an angular position sensor for sensing angular position about the elevation subassembly rotational axis.

* * * * *